(12) United States Patent
Ohnishi et al.

(10) Patent No.: US 6,385,038 B1
(45) Date of Patent: May 7, 2002

(54) ELECTRONIC DEVICE

(75) Inventors: Masuo Ohnishi; Masahiko Sato, both of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/809,250

(22) Filed: Mar. 16, 2001

(30) Foreign Application Priority Data

Oct. 13, 2000 (JP) ........................................ 2000-314159

(51) Int. Cl.[7] .............................................. G06F 3/147
(52) U.S. Cl. ...................... 361/683; 361/684; 361/796; 439/534; 455/90
(58) Field of Search ................................ 361/683, 679, 361/680, 704, 699, 777, 796, 681, 684–686, 724–727; 439/74, 534; 174/52.2; 455/90

(56) References Cited

U.S. PATENT DOCUMENTS 5,690,306 A * 11/1997 Roesner ...................... 361/683
5,959,844 A * 9/1999 Simon et al. ................ 361/759

FOREIGN PATENT DOCUMENTS

| JP | 2000-89854 | 3/2000 |
| WO | WO 00/16184 | 3/2000 |

* cited by examiner

*Primary Examiner*—Darren Schuberg
*Assistant Examiner*—Hung Van Duong
(74) *Attorney, Agent, or Firm*—Armstrong, Westerman & Hattori LLP

(57) ABSTRACT

The electronic device has a first mounting portion with an engaging portion and a second mounting portion with an engaging portion in the housing. A first connector is arranged in the first mounting portion, and a second connector or other member is arranged in the second mounting portion. The second connector is either a third connector having a first shape and having the engaging portion or a fourth connector or other member having a second shape different from the first shape and having the identical engaging portion. The electronic device enables a plurality of connectors and other members to be selectively arranged in two connector mounting portions in the housing.

8 Claims, 16 Drawing Sheets

ELECTRONIC DEVICE

BACKGROUND OF THE INVENTION

1. Field of the Invention

The present invention relates to an electronic device and, particularly, to a portable type electronic device.

2. Description of the Related Art

A portable electronic device can be represented by a notebook type personal computer. It is required to provide a notebook type personal computer which is small in size, light in weight and has ever higher functions. The notebook personal computer has slots for inserting PC cards for expanding the functions and has a plurality of connectors for connection to external units.

Japanese Unexamined Patent Publication (Kokai) No. 2000-89854 discloses an electronic device that can be used as a notebook type personal computer incorporating a modem therein or as a notebook type personal computer incorporating a LAN therein. The notebook type personal computer that incorporates the modem therein includes a circuit for realizing the modem function and a connector for the modem, the connector for the modem being designed to be connected to an external connector for the modem. The notebook type personal computer that incorporates the LAN adapter therein includes a circuit for realizing a LAN function and a connector for the LAN adapter, the connector for the LAN adapter being designed to be connected to an external connector of a LAN. In this prior art, a portion of a circuit corresponding to a portion of the circuit for realizing the modem function and a portion of the circuit for realizing the LAN function which is common to the portion of the circuit for realizing modem function, is mounted to a main printed circuit board, the remaining portion of the circuit for realizing the modem function and the connector for the modem are formed as a modem assembly, and the remaining portion of the circuit for realizing the LAN function and the connector for the LAN are formed as a LAN assembly. Therefore, it is possible to easily produce the notebook type personal computer incorporating the modem or the notebook type personal computer incorporating the LAN, by selectively using the modem assembly and the LAN assembly.

There has further been proposed a notebook type personal computer capable of using both the modem and the LAN. This notebook type personal computer includes a circuit for realizing the modem function, a circuit for realizing the LAN function, a connector for the modem and a connector for the LAN adapter. The connector for the modem and the connector for the LAN adapter are arranged adjacent to each other. In this constitution, the modem and the LAN can be used by connecting an external connector for the modem and an external connector for the LAN adapter to the connector for the modem and to the connector for the LAN adapter, respectively.

However, both the connector for the modem and the connector for the LAN as connection ports for communication are not simultaneously used at all times, but either one of them is selectively used in many cases. In a general household, for example, the connector for the modem only is used, and a person who always carries the notebook type personal computer with him uses the connector for the modem only. Alternatively, the connector for the LAN only is used when the personal computer is stationarily used in an office even though the notebook type personal computer is of the portable nature, or, the connector for the modem only is used even in the office depending upon the scale of the company.

In such cases, an extra connector is attached to the notebook type personal computer as a result.

In recent years, further, there has been placed in the market a notebook type personal computer incorporating a DVD-ROM drive or therein to which the DVD-ROM drive can be connected. An output connector is necessary for outputting the image reproduced by using the DVD-ROM drive that is incorporated in the notebook type personal computer or that is connected to the notebook type personal computer to an image display unit such as a household TV set. This is called an S-terminal, for example.

It is, however, difficult to provide connector mounting portions for both the connector for the LAN adapter and the connector for the modem as well as for the S-terminal in a limited space in the notebook type personal computer, which has been realized in ever smaller sizes year after year.

SUMMARY OF THE INVENTION

It is an object of the present invention to provide an electronic device which has a limited number of mounting portions and permits a selective arrangement of a plurality of connectors or other members of a number in excess of the number of the connector mounting portions.

An electronic device according to the present invention comprises a housing having a first mounting portion with an engaging portion and a second mounting portion with an engaging portion; a first connector having an engaging portion engaged with the engaging portion of the first mounting portion and arranged in the first mounting portion; and a second connector having an engaging portion engaged with the engaging portion of the second mounting portion and arranged in the second mounting portion; wherein the second connector is one of a third connector having a first shape and having said engaging portion and a fourth connector having a second shape different from the first shape and having said engaging portion.

In the present invention, inventors have contrived such a structure that a connector (S-terminal) for outputting image data can be added when the notebook type personal computer is provided with, for example, the connector for the modem and the connector for the LAN. The housing has the first mounting portion for arranging the connector for the modem and the second mounting portion for arranging the connector for the LAN. Now, the connector for the LAN is removed from the second mounting portion, and instead, the connector for outputting the image data can be arranged on the second mounting portion.

However, the connector for outputting the image has a shape different from that of the connector for the LAN, and therefore, the connector for outputting the image cannot just be fitted to the second mounting portion which is designed for arranging the connector for the LAN. In the present invention, however, the connector for outputting the image and the connector for the LAN, that have different shapes, have a common engaging portion. Upon fitting the common engaging portion to the corresponding engaging portion of the second mounting portion, therefore, either connector can just be fitted to the second mounting portion. It is thus possible to arrange the connector for the modem, the connector for the LAN and the connector for outputting the image data in a space in which heretofore have only been arranged the connector for the modem and the connector for the LAN. Thus, three connectors can be selectively arranged in the space which is only capable of arranging two connectors.

The connectors used in the present invention are not limited to the connector for the modem, the connector for the LAN and the connector for outputting the image. It is further possible to arrange members of a structure resembling the connectors in the housing of the electronic device.

BRIEF DESCRIPTION OF THE DRAWINGS

The present invention will become more apparent from the following description of the preferred embodiments, with reference to the accompanying drawings, in which.

DESCRIPTION OF THE PREFERRED EMBODIMENTS

Embodiments of the present invention will now be described with reference to the drawings.

Figure 1:
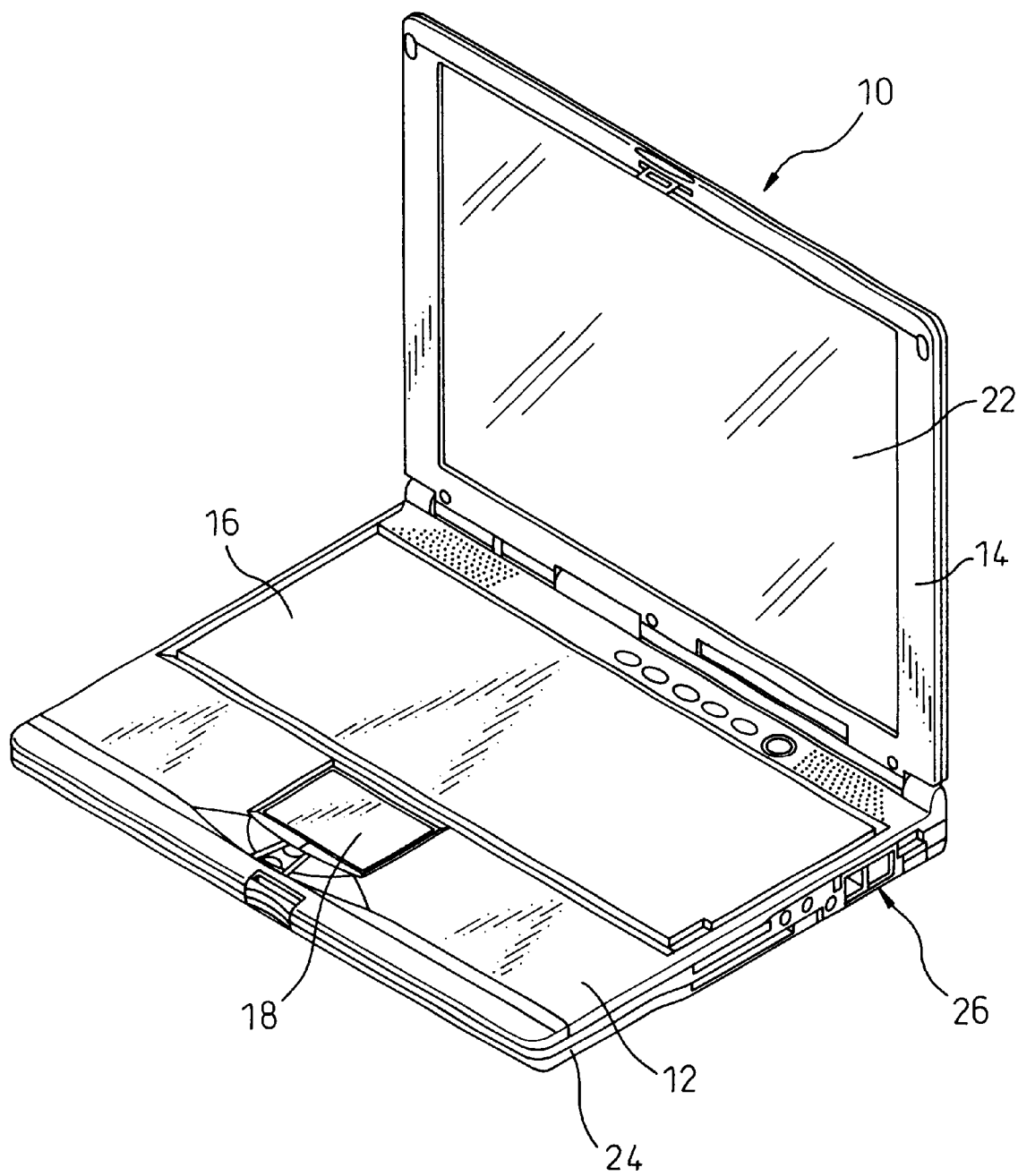
FIG. 1 is a perspective view illustrating a notebook type personal computer as an embodiment of an electronic device according to the present invention.

FIG. 1 is a perspective view illustrating a notebook type personal computer as an example of an electronic device according to the present invention. The notebook type personal computer 10 includes a device body 12 and a display unit 14. The device body 12 is provided with a keyboard unit 16 and a touch pad 18. The display unit 14 has a display surface 22 of, for example, a liquid crystal display unit. The device body 12 includes a housing 24 constituted by an upper panel and a lower panel. The side surface of the housing 24 is provided with a connector structure 26 which is a feature of the present invention. The connector structure 26 will now be described.

Figure 2:
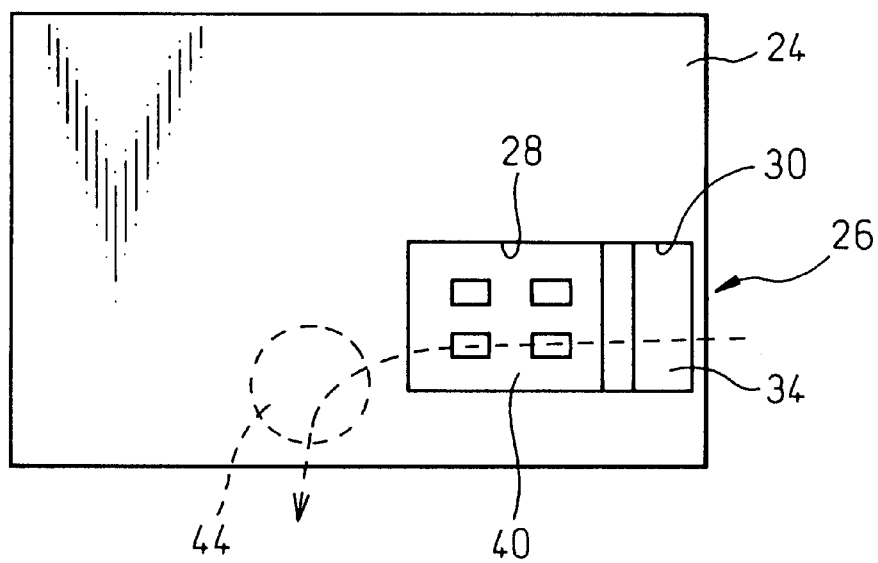
FIG. 2 is a schematic bottom view illustrating the bottom of the housing of the notebook type personal computer of FIG. 1, with the module cover removed.
Figure 3:
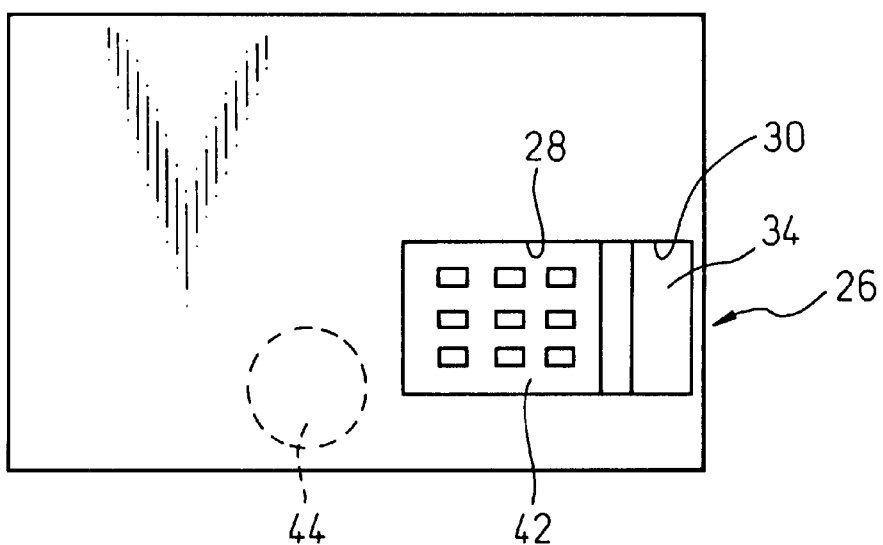
FIG. 3 is a schematic bottom view illustrating the bottom of the housing of FIG. 2, with the circuit module removed.
Figure 4:
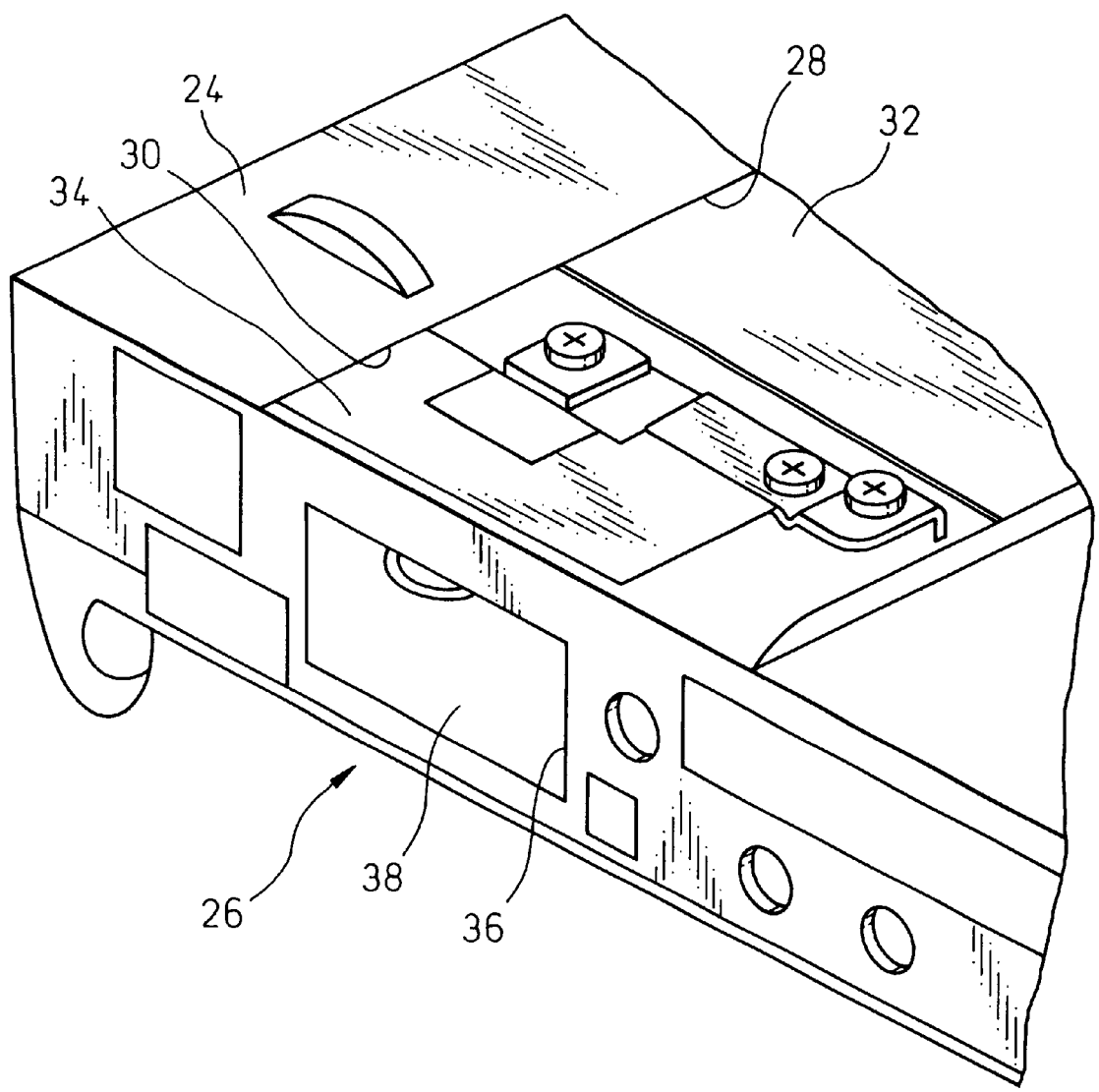
FIG. 4 is a bottom perspective view illustrating a portion of the housing shown in FIGS. 1 to 3.

FIGS. 2 and 3 are views illustrating the bottom of the housing 24 of the notebook type personal computer of FIG. 1. FIG. 4 is a perspective view illustrating the bottom of a portion of the housing 24 of the notebook type personal computer shown in FIGS. 1 to 3, and FIG. 5 is a bottom view showing the bottom of the housing 24 of FIG. 4.

In FIGS. 2 to 5, the lower panel on the bottom side of the housing 24 has openings 28 and 30. A module cover 32 is arranged in the opening 28, and a metal fitting 34 for securing the connectors is arranged in the opening 30. The side of the housing 24 has an opening 36, and a side cover 38 is arranged in the opening 36.

FIG. 2 illustrates the housing in a state where the module cover 32 is removed. The notebook type personal computer 10 has a circuit module 40 which is exposed from the bottom of the housing when the module cover 32 is removed. FIG. 3 illustrates the housing 24 in a state where the circuit module 40 has been removed. The notebook type personal computer 10 has a main circuit board 42. Upon removing the circuit module 40, the main circuit board 42 is exposed from the bottom of the housing 24. The keyboard unit 16, the touch pad 18, the display unit 14 and other electric parts are electrically connected to the main circuit board 42, and connectors that will be described later are connected to the circuit module 40.

A cooling fan 44 is arranged in the housing 24, and the cooling air flows as indicated by a dotted arrow. The cooling air cools the circuit module 40 and the main circuit board 42.

Figure 5:
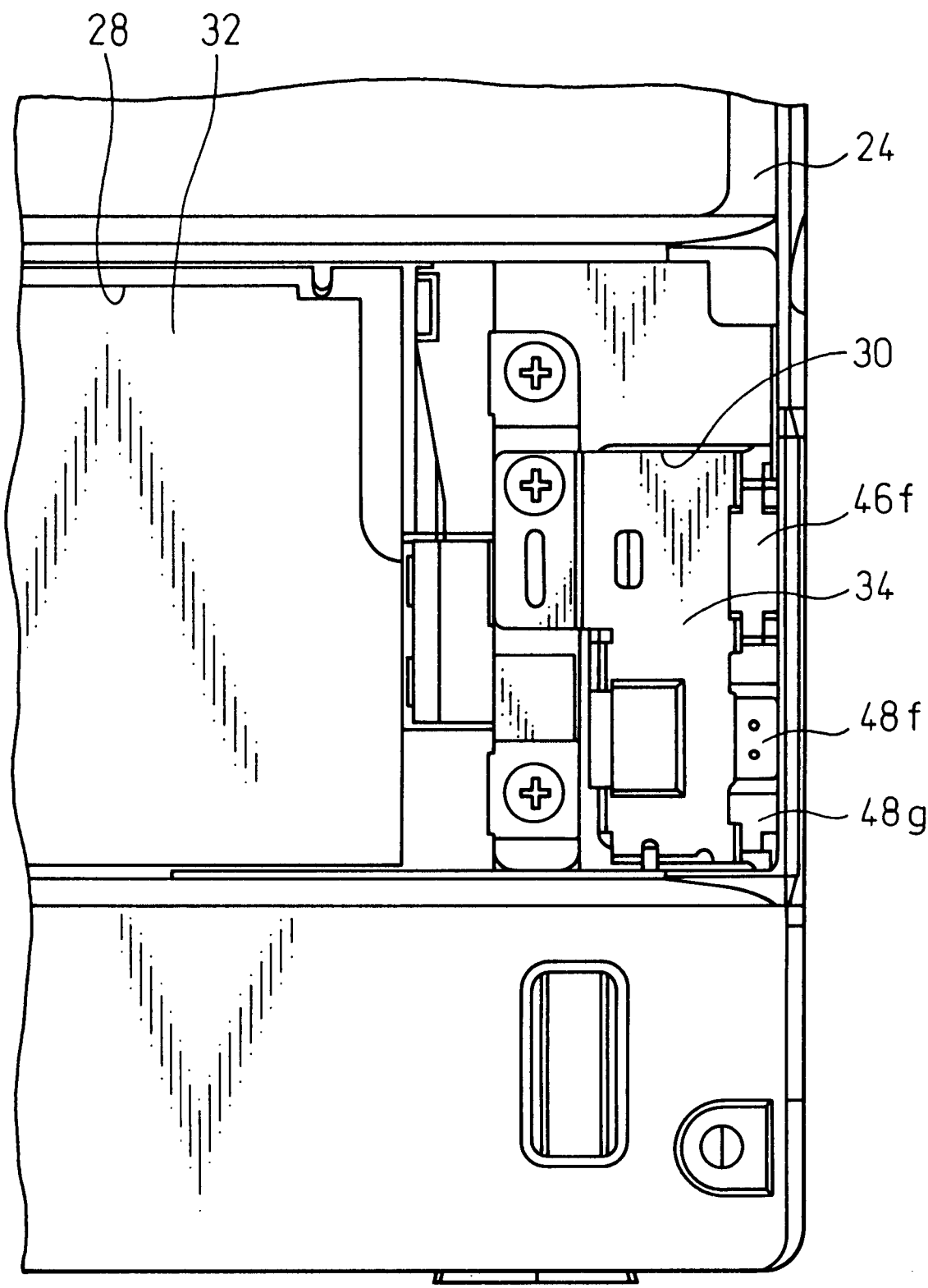
FIG. 5 is a bottom view illustrating the bottom of the housing of FIG. 4.
Figure 6:
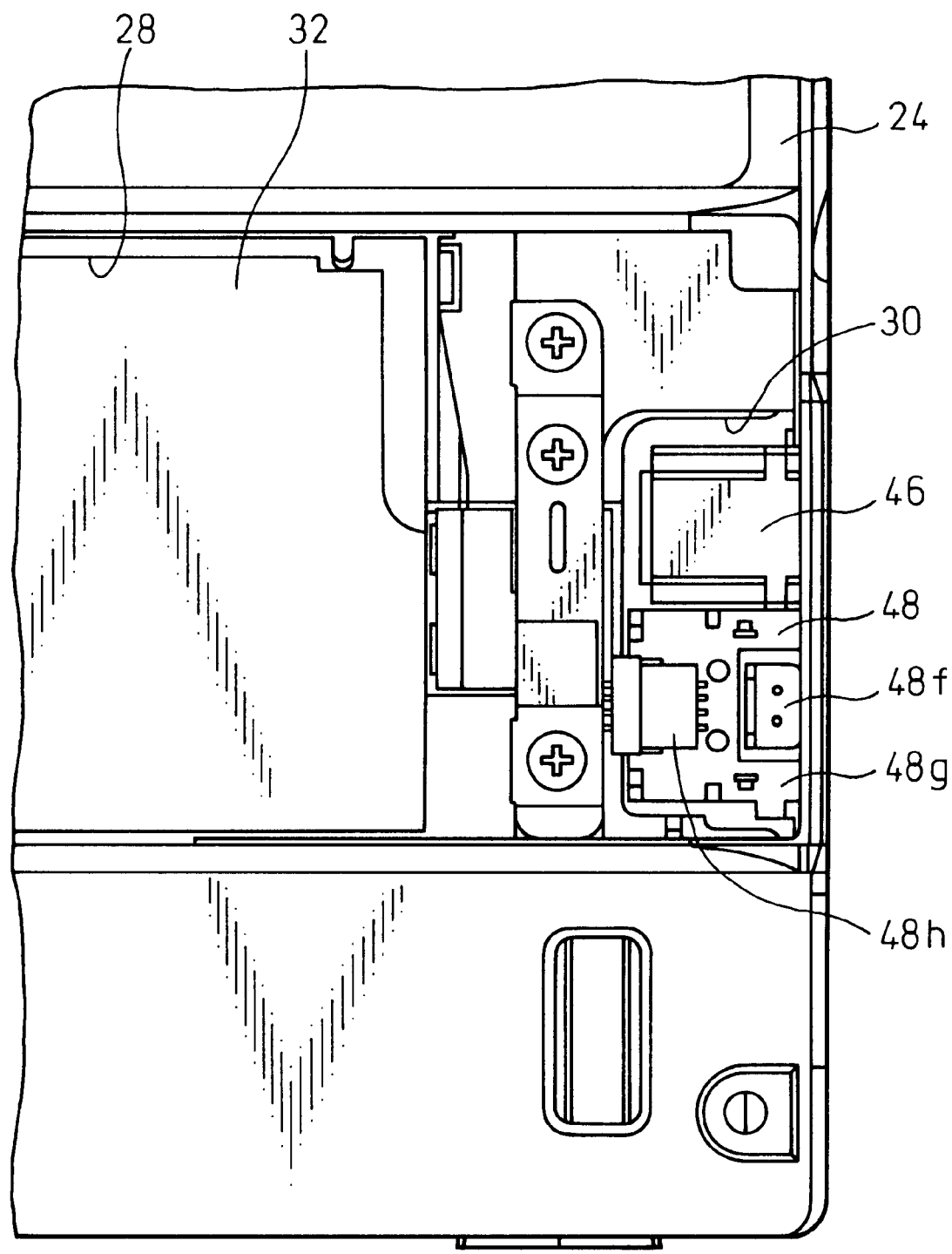
FIG. 6 is a bottom view illustrating the bottom of the housing of FIG. 5, with the metal fitting for securing the connectors removed.
Figure 7:
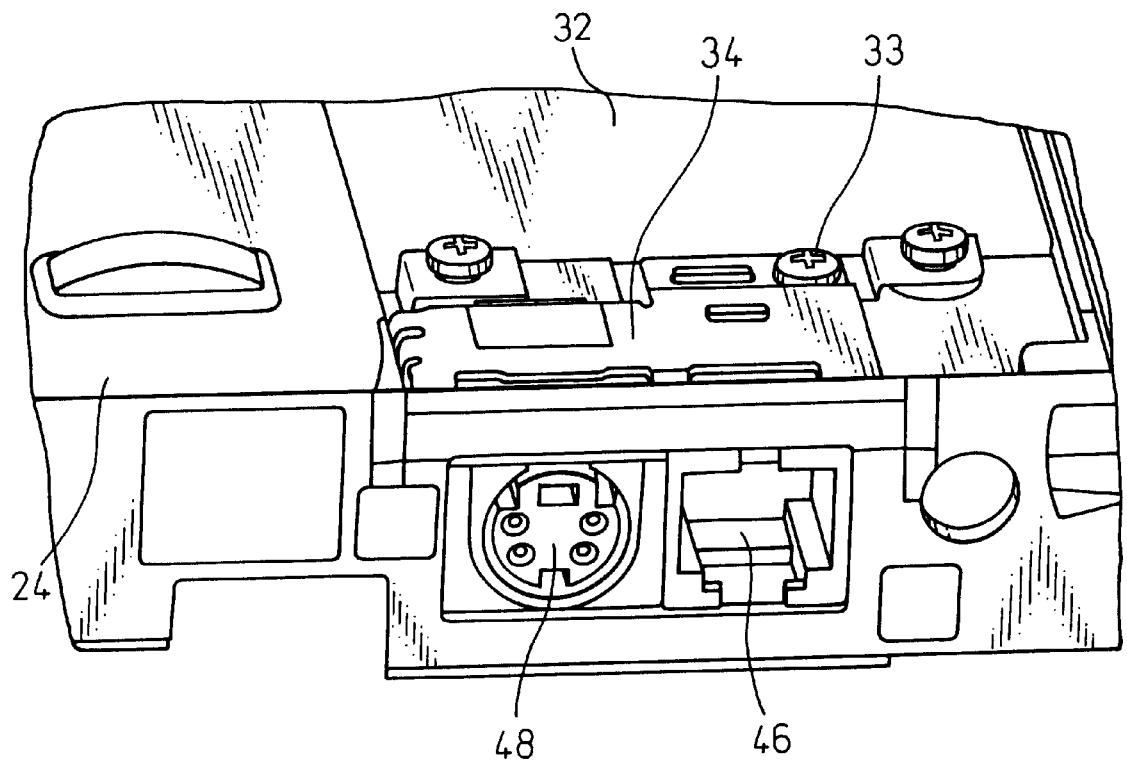
FIG. 7 is a bottom perspective view of illustrating a portion of the housing in which are arranged the connector for the modem and the connector for outputting the image.
Figure 8:
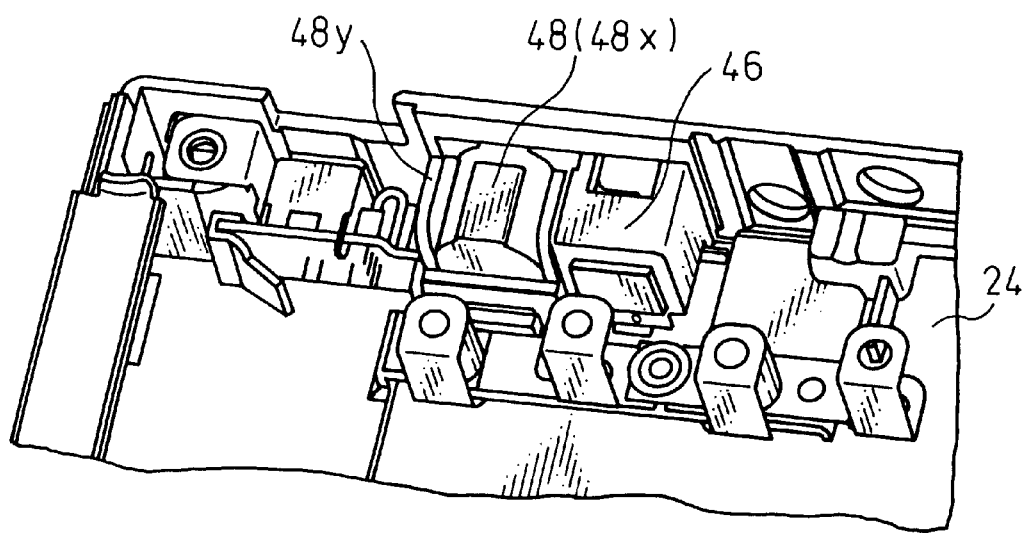
FIG. 8 is an upper perspective view illustrating the housing of FIG. 7, with the upper panel and the intermediate member removed.

FIG. 6 is a bottom view showing the bottom of the housing 24 of FIG. 5 in a state where the metal fitting 34 for securing the connectors is removed, FIG. 7 is a perspective view showing the bottom of a portion of the housing 24 of FIG. 5 in a state where the side cover 38 has been removed, and FIG. 8 is an upper perspective view of the housing 24 of FIG. 7 in a state where the upper panel and the intermediate member have been removed.

In FIGS. 6 to 8, a connector 46 for the modem and a connector 48 for outputting the image are arranged in the side of the housing 24.

Figure 9:
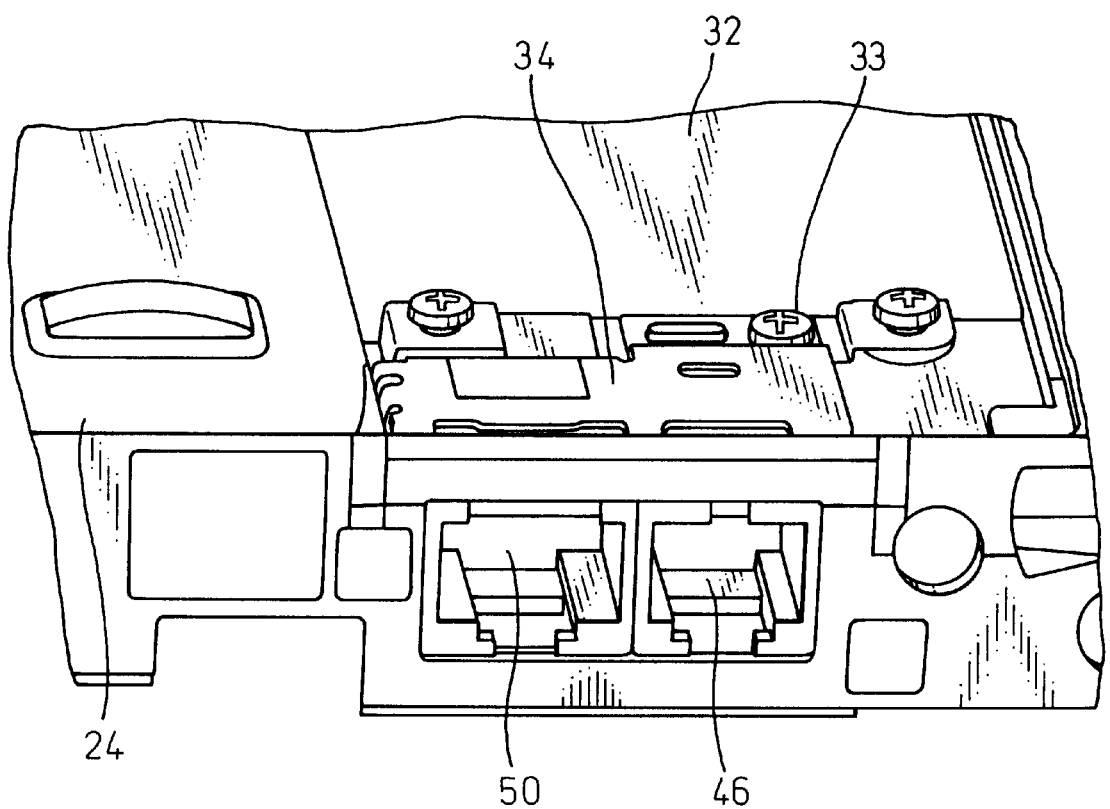
FIG. 9 is a perspective view illustrating the bottom of a portion of the housing in which are arranged the connector for the modem and the connector for the LAN.

FIG. 9 is a perspective view showing the bottom of the housing 24 like FIG. 7, and illustrates a state where the connector 46 for the modem and the connector 50 for the LAN are arranged in the housing 24.

As shown in FIGS. 7 and 9, the connector 46 for the modem and the connector 48 for outputting an image, or the connector 46 for the modem and the connector 50 for the LAN, are selectively arranged in the same housing 24.

Figure 10:
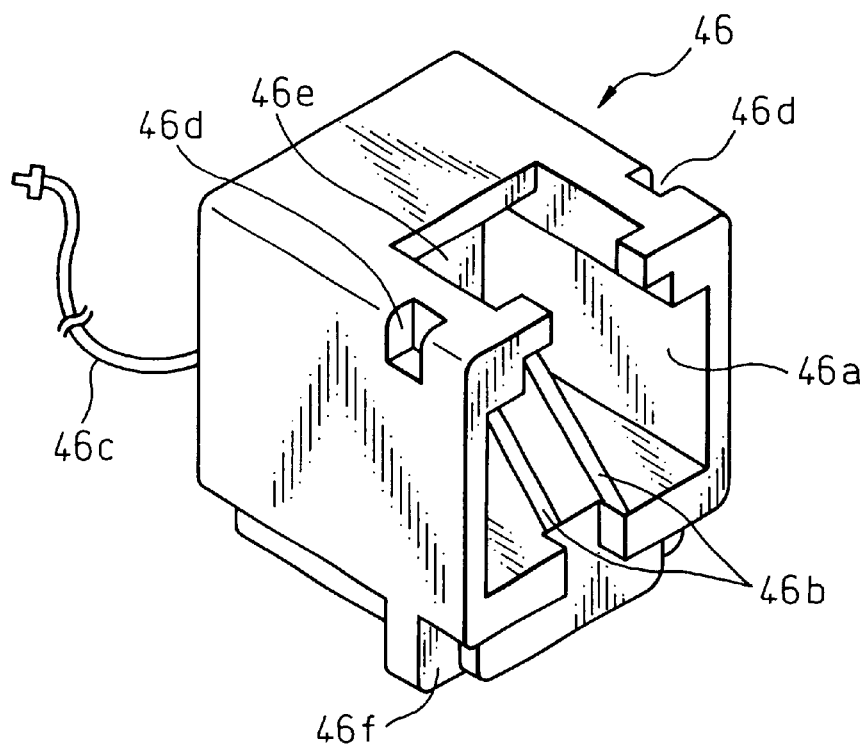
FIG. 10 is a perspective view illustrating the connector for the modem.

FIG. 10 is a perspective view showing the connector 46 for the modem. The connector 46 for the modem has roughly a rectangular outer shape, and has a socket portion 46a on the front side thereof for receiving a corresponding external connector for the modem. The socket portion 46a has terminals 46b that electrically connect to the terminals of the corresponding external connector for the modem, the terminals 46b being connected to a cable 46c. The cable 46c is connected to the circuit module 40.

The connector 46 for the modem has a pair of engaging recesses 46d at both ends in the top portions on the outer surface thereof in FIG. 10, an end wall 46e, and a stopper portion 46f at the bottom on the outer surface thereof in FIG. 10.

Figure 11:
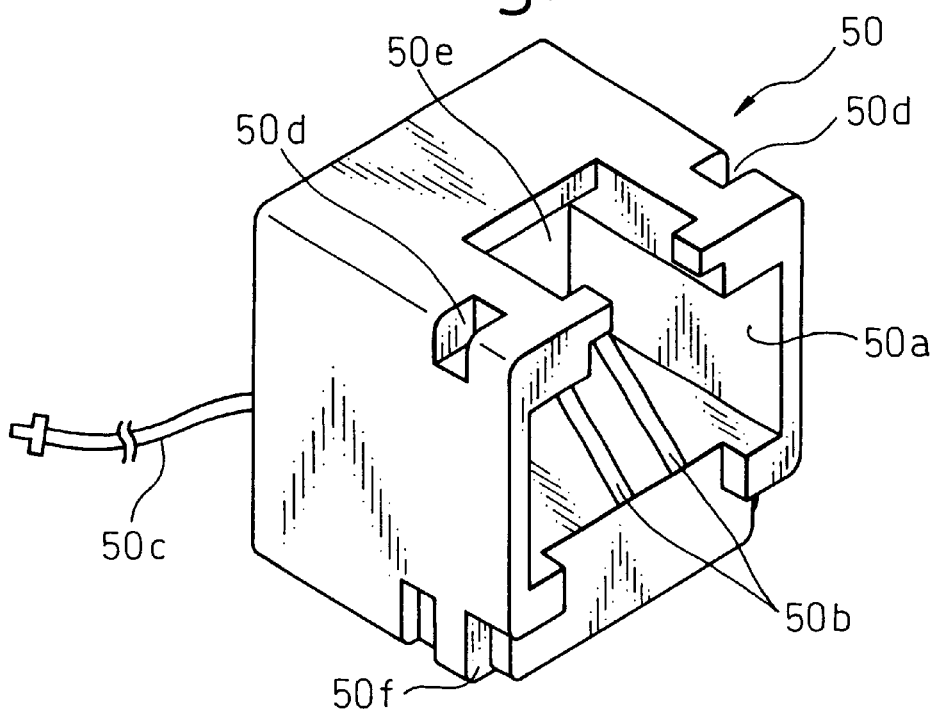
FIG. 11 is a perspective view illustrating the connector for the LAN.

FIG. 11 is a perspective view illustrating the connector 50 for the LAN. The connector 50 for the LAN has roughly a rectangular outer shape and has a socket portion 50a formed therein for receiving a corresponding external connector for the LAN. The socket portion 50a has terminals 50b electrically connected to the terminals of the corresponding external connector for the LAN, the terminals 50b being connected to a cable 50c. The cable 56c is connected to the circuit module 40.

The connector 50 for the LAN has a pair of engaging recesses 50d at both ends in the top portions on the outer surface thereof in FIG. 11, an end wall 50e, and a stopper portion 50f at the bottom on the outer surface thereof in FIG. 11. In this embodiment, the height of the connector 46 for the modem is the same as the height of the connector 50 for the LAN, but the width of the connector 46 for the modem is smaller than the width of the connector 50 for the LAN.

The circuit module 40 includes a circuit for realizing the modem function and a circuit for realizing the LAN function. As shown in FIG. 9, therefore, the modem and the LAN can be used when the connector 46 for the modem and the connector 50 for the LAN are arranged in the housing 24 of the notebook type personal computer, and when the external connector for the modem and the external connector for the LAN are fitted to these connectors 46 and 50.

Figure 12:
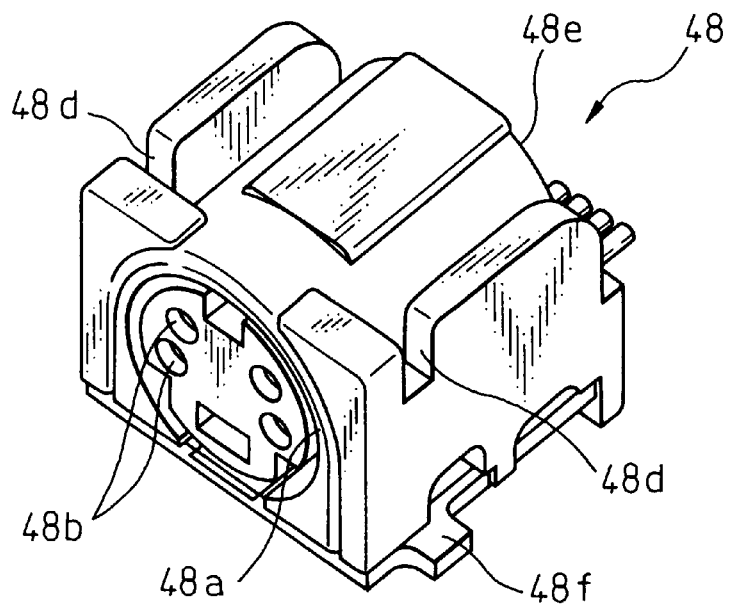
FIG. 12 is a perspective view illustrating the connector for outputting the image.
Figure 13:
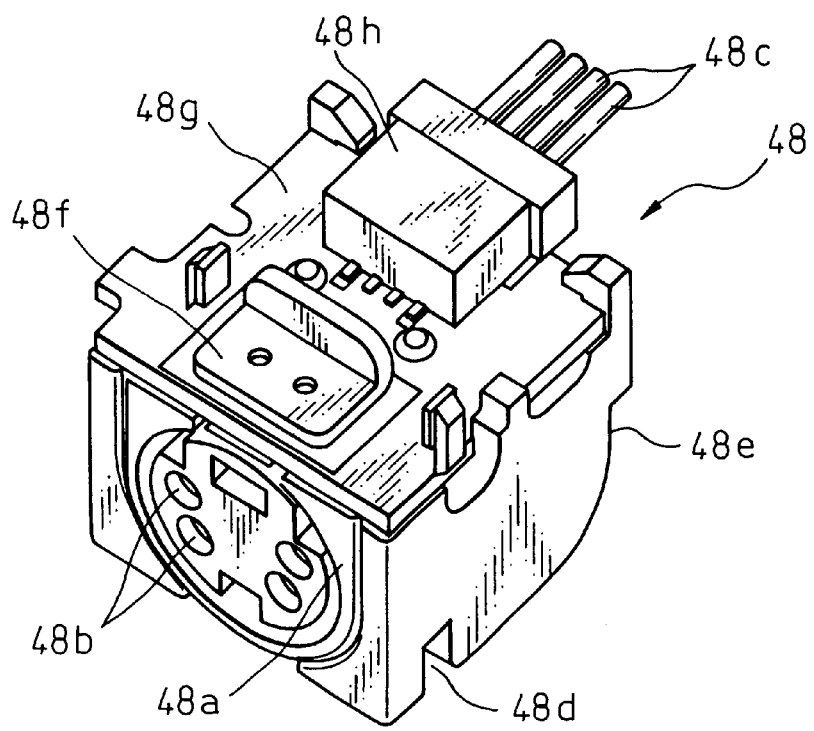
FIG. 13 is a perspective of the connector for outputting the image shown in FIG. 12 as viewed from the side of the bottom.

FIG. 12 is a perspective view illustrating the connector 48 for outputting the image, and FIG. 13 is a perspective view illustrating the connector 48 for outputting the image when the connector 48 for outputting the image of FIG. 12 is viewed from the bottom thereof. The connector 48 for outputting the image has a socket portion 48a for receiving the corresponding external connector for outputting the image, and the socket portion 48a has terminals 48b that are electrically connected to the terminals of the corresponding external connector for outputting the image, the terminals 48b being connected to cables 48c. The cables 48c are connected to the main circuit board 42.

The connector 48 for outputting the image has a pair of engaging recesses 48d at both ends in the top portions on the outer surface thereof in FIG. 12, an end wall 48e, and a stopper portion 48f at the bottom on the outer surface thereof in FIG. 12. The stopper portion 48f is also shown in FIG. 13.

Figure 14:
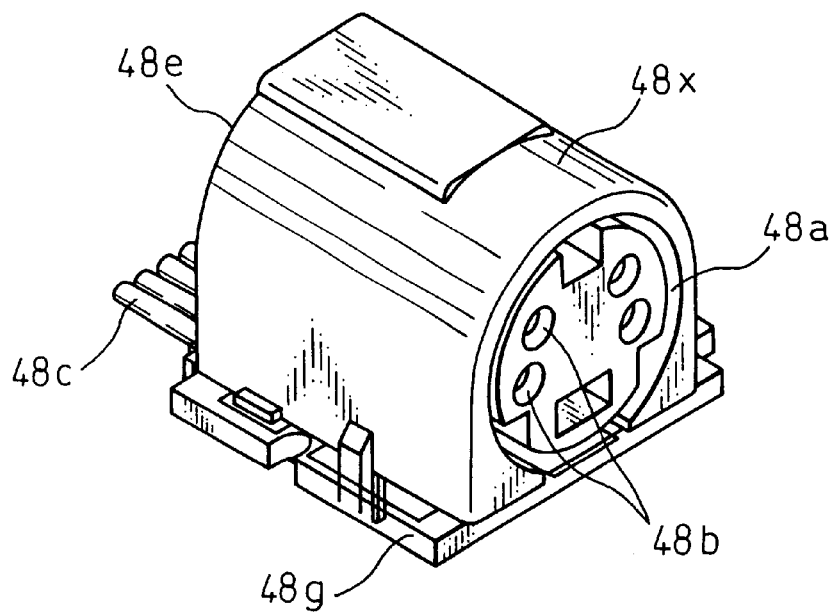
FIG. 14 is a perspective view illustrating the connector body of the connector for outputting the image shown in FIGS. 12 and 13.
Figure 15:
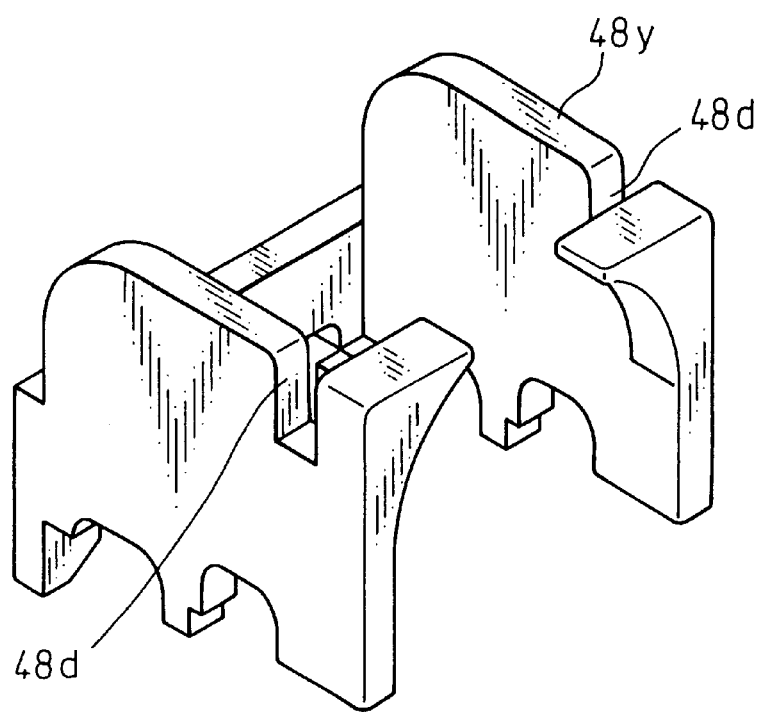
FIG. 15 is a perspective view illustrating the holder of the connector for outputting the image of FIGS. 12 and 13.

The connector 48 for outputting the image is an assembly of a connector body 48X shown in FIG. 14 and a holder 48Y shown in FIG. 15. The connector body 48X is one having a shape that is generally seen as the connector for outputting the image, and has an outer shape considerably smaller than the connector 50 for the LAN. The connector body 48X further includes a DVD substrate 48g and an intermediate connector 48h. The stopper portion 48f is provided on the DVD substrate 48g. The holder 48Y has the pair of engaging recesses 48d.

The holder 48Y holds the connector body 48X, and imparts a feature common to the connector 50 for the LAN to the connector 48 for outputting the image. That is, the connector 48 for outputting the image, as an assembly, has a shape different from the shape of the connector 50 for the LAN, but has the height and the width which are nearly the same as the height and the width of the connector 50 for the LAN. In particular, the relationship among the engaging recesses 48d, the end wall 48e and the stopper portion 48f of the connector 48 for outputting the image, is the same as the relationship among the engaging-recesses 50d, the end wall 50e and the stopper portion 48f of the connector 50 for the LAN.

The attitudes of the connector 46 for the modem and of the connector 50 for the LAN shown in FIG. 9 are in reverse, in the top-and-bottom sense, to the attitudes of the connector 46 for the modem and of the connector 50 for the LAN shown in FIGS. 10 and 11. The attitudes of the connector 46 for the modem and of the connector 48 for outputting the image shown in FIG. 7 are in reverse, in the top-and-bottom sense, to the attitudes of the connector 46 for the modem and of the connector 48 for outputting the image shown in FIGS. 10 and 12. Namely, the attitude of the connector 48 for outputting image shown in FIG. 7 is the same as the attitude of the connector 48 for outputting the image shown in FIG. 13. In the connector 48 for outputting the image shown in FIGS. 7 and 13, the stopper portion 48f and the intermediate connector 48h are protruding beyond the DVD substrate 48f.

Figure 22:
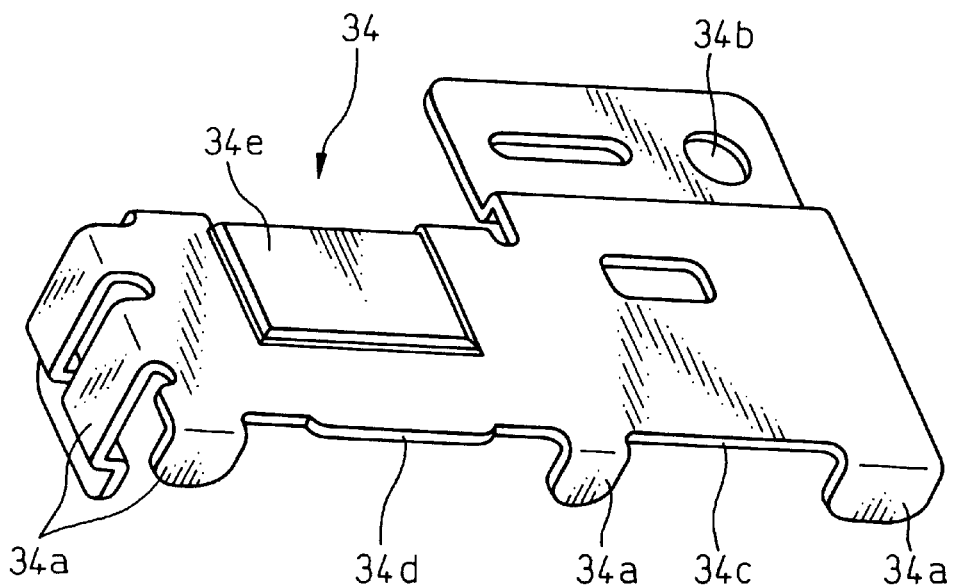
FIG. 22 is a perspective view illustrating the metal fitting for securing the connector.
Figure 23:
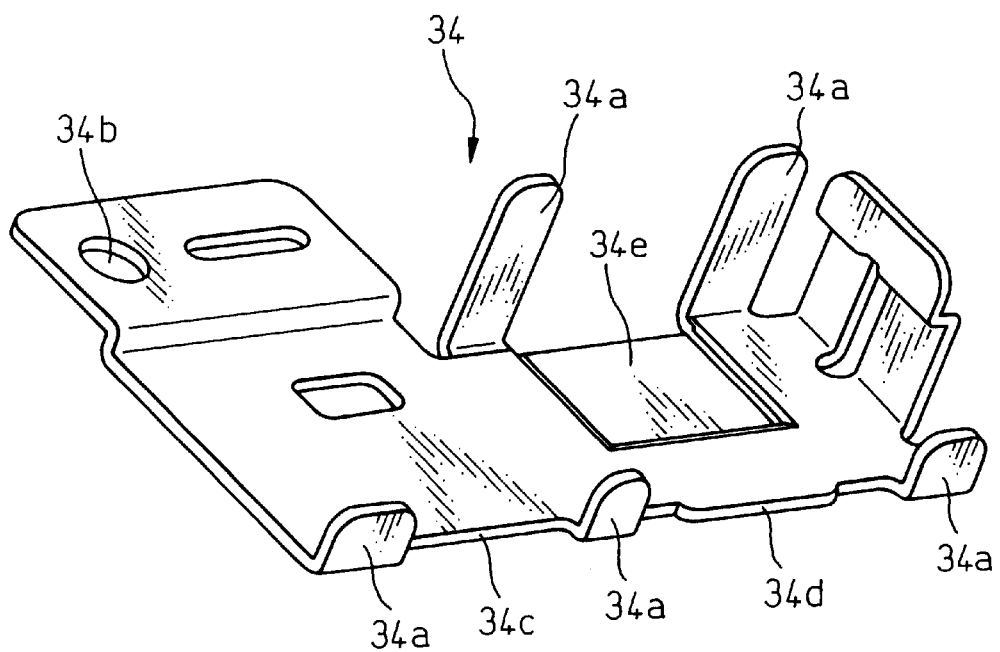
FIG. 23 is a perspective view illustrating the metal fitting for securing the connector as viewed from a side opposite to the side of FIG. 22.

FIGS. 22 and 23 are perspective views illustrating the metal fitting 34 for securing the connectors. The metal fitting 34 for securing the connectors is formed by bending and punching a piece of flat metal plate. The metal fitting 34 for securing the connectors has a generally flat portion, pawls 34a downwardly bent from the flat portion for mounting the metal fitting 34 on the housing 24 and a hole 34b, and can be secured onto the housing 24 of the notebook type personal computer by inserting a screw 33 (FIGS. 7 and 9) in the hole 34b.

The metal fitting 34 for securing the connectors has a holding portion 34c at one side of the flat portion for the connector 46 for the modem and a holding portion 34d also at one side of the flat portion for the connector 50 for the LAN or for the connector 48 for outputting the image. Further, the metal fitting 34 for securing the connectors has a bulge portion 34e.

In FIG. 9, the metal fitting 34 for securing the connectors holds and secures the connector 46 for the modem and the connector 50 for the LAN. In this case, the flat portion of the metal fitting 34 for securing the connectors holds the bottom surfaces of the connector 46 for the modem and of the connector 50 for the LAN shown in FIGS. 10 and 11, and the holder portions 34c and 34d are brought into engagement with the stopper portions 46f and 50f.

Figure 24:
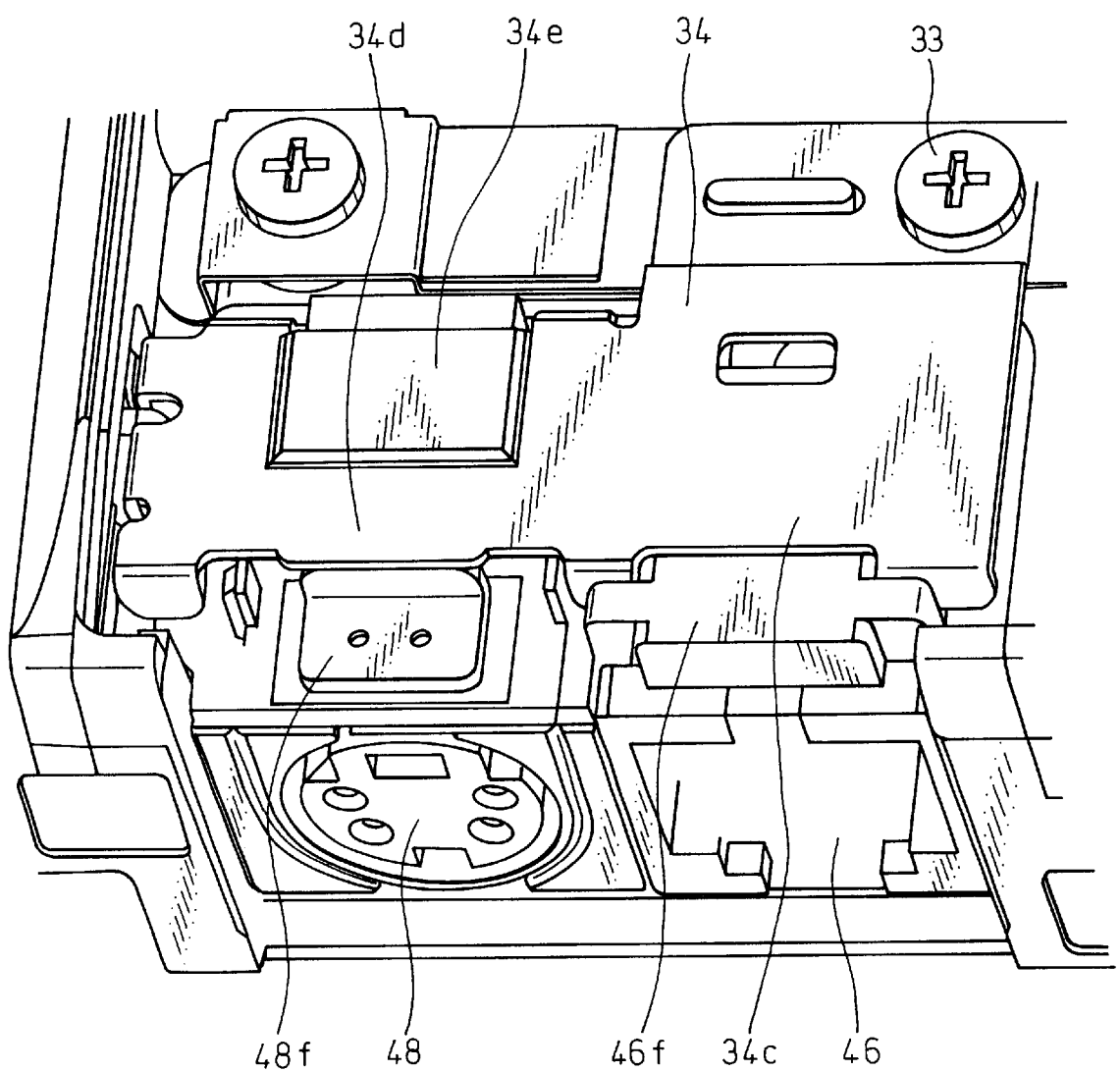
FIG. 24 is a perspective view illustrating, on an enlarged scale, a portion of the housing for illustrating a relationship between the connector and the metal fitting for securing the connector.

In FIG. 7, the metal fitting 34 for securing the connectors holds and secures the connector 46 for the modem and the connector 48 for outputting the image. In this case, as shown in FIG. 24, the flat portion of the metal fitting 34 for securing the connectors holds the bottom surfaces of the connector 46 for the modem and of the connector 48 for outputting the image shown in FIGS. 10 and 11, and the holder portions 34c and 34d are brought into engagement with the stopper portions 46f and 58f.

As described above, the connector structure 26 of the present invention makes it possible to arrange not only a plurality of connectors but also the connectors and members other than the connectors.

Figure 16:
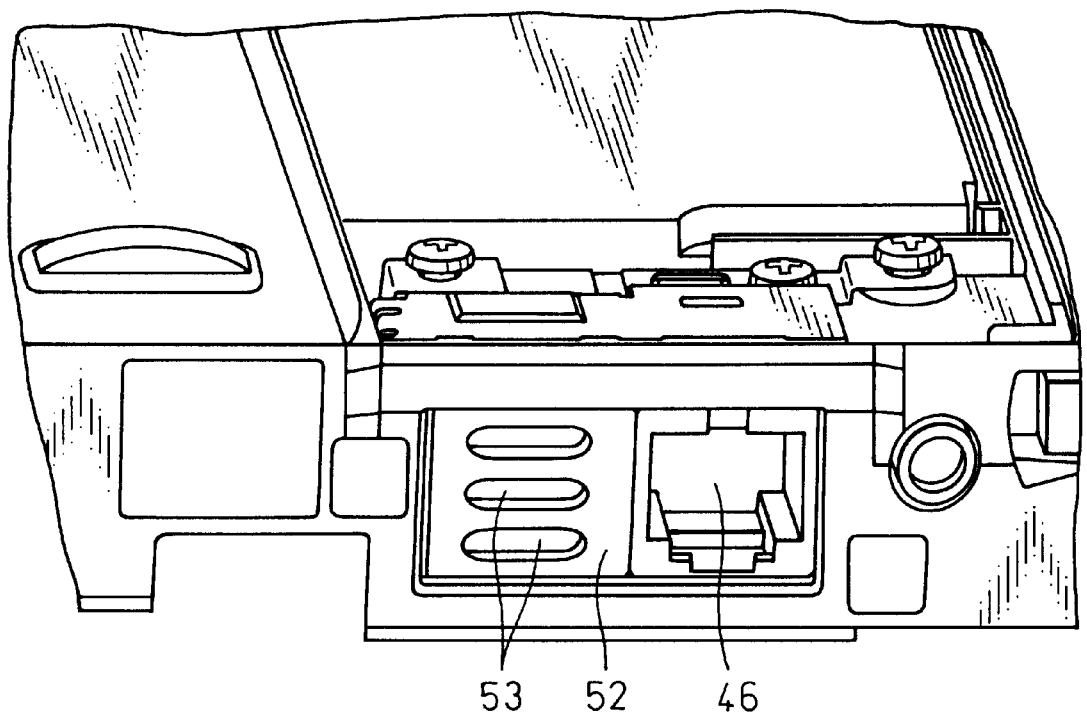
FIG. 16 is a perspective view illustrating the bottom surface of a portion of the housing in which are arranged the connector for the modem and the member having air holes.
Figure 17:
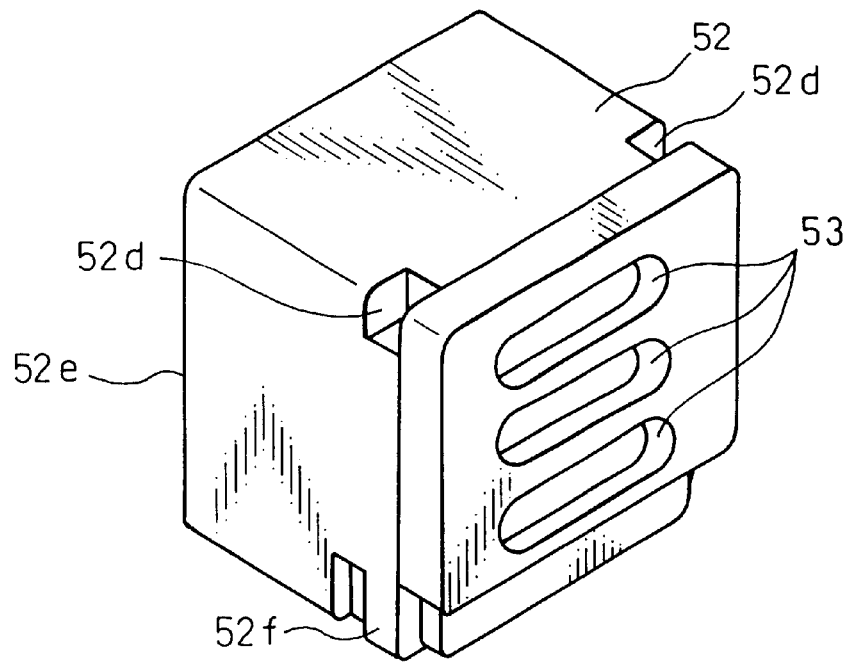
FIG. 17 is a perspective view illustrating the member having air holes.

FIG. 16 is a perspective view of the bottom of a portion of the housing 24 in which are arranged the connector 46 for the modem and a member 52 having air holes. That is, the member 52 having air holes is arranged in the housing 24 instead of arranging the connector 50 for the LAN or the connector 48 for outputting the image FIG. 17 is a perspective view illustrating the member having air holes.

The member 52 has air holes 53 and a ventilating hole penetrating through the member 52 to be communicated with the air holes 53. As described with reference to FIG. 2, therefore, the cooling air is sucked by the cooling fan 44 through the member 52, and flows along the circuit module 40 and the main circuit board 42 as indicated by the arrow of dotted line. Therefore, the cooling air flows in an amount larger than that when the position of the member 52 is occupied by the connector 50 or 48. Arranging the member 52 having air holes 53 is effective when at least either the circuit module 40 or the main circuit board 42 generates heat in large amounts.

The member 52 has an outer shape similar to that of the connector 50 for the LAN, and includes a pair of engaging recesses 52d, an end wall 52e and a stopper portion 52f. The relationship between the engaging recesses 52d, the end wall 52e and the stopper portion 52f, is the same as the relationship among the engaging recesses 50d, the end wall 50e and the stopper portion 50f of the connector 50 for the LAN.

Figure 18:
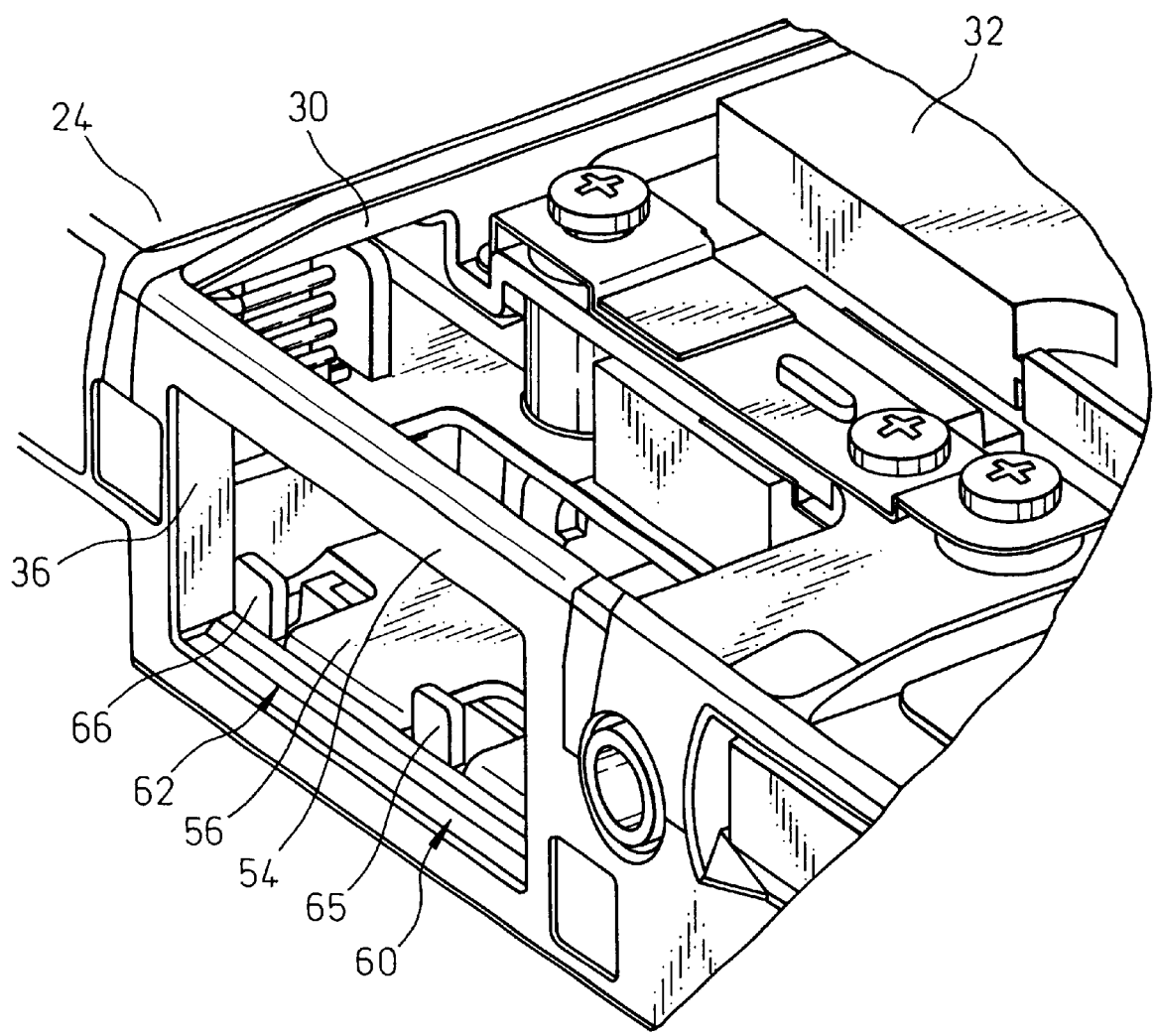
FIG. 18 is a perspective view illustrating the bottom of the housing of the notebook type personal computer shown in FIGS. 1 to 16.
Figure 19:
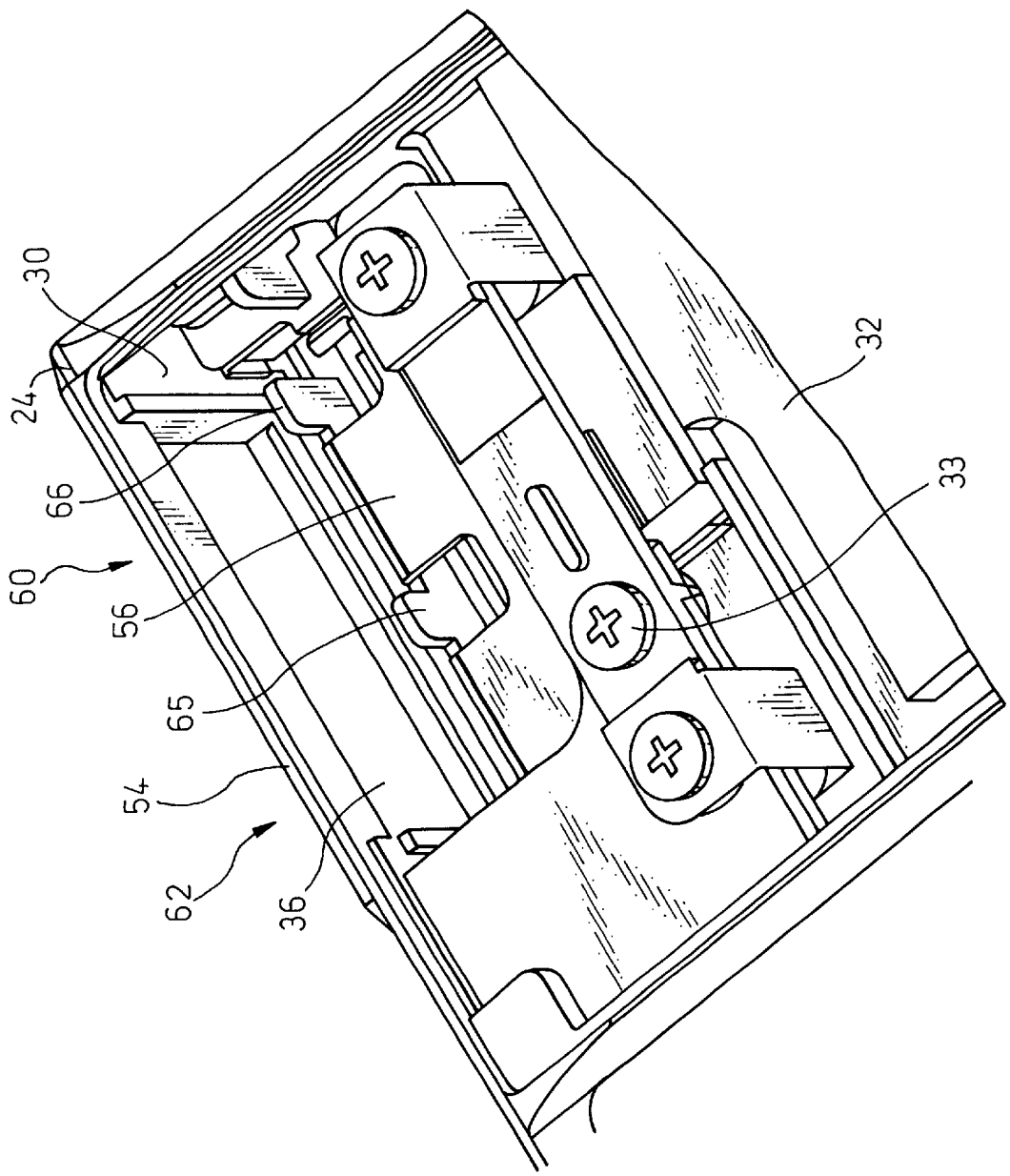
FIG. 19 is an upper perspective view illustrating a portion of the housing of FIG. 18.

FIG. 18 is a perspective view of the bottom of the housing 24 of the notebook type personal computer shown in FIGS. 1 to 16 in a state where none of the connectors 46, 48, 50 and the member 52 have been arranged. FIG. 19 is an upper perspective view of a portion of the housing 24 shown in FIG. 18 as viewed from the side of the module cover 32, and FIG. 20 is a perspective view of a connector support plate of the housing 24 shown in FIGS. 18 and 19.

In FIGS. 18 to 21, a straight transverse wall 54 extends between the opening 30 in the bottom of the housing 24 and the opening 36 in the side thereof. The transverse wall 54 has a resiliency to some extent. The connector support plate 56 is arranged on the upper panel of the housing 24 (on the bottom side in FIGS. 18 and 19).

The housing 24 of the notebook type personal computer includes a first mounting portion 60 for arranging the connector 46 for the modem and a second mounting portion 62 for arranging one of the connector 50 for the LAN, the connector 48 for outputting image and the member 52. The first mounting portion 60 has a first engaging portion 64 and 65 with which will be engaged the engaging recesses 46d of the connector 46 for the modem. The second mounting portion 62 has a second engaging portion 65 and 66 with which will be engaged the engaging recesses 48d, 50d or 52d of the connector 50 for the LAN, the connector 48 for outputting image or the member 52.

Figure 20:
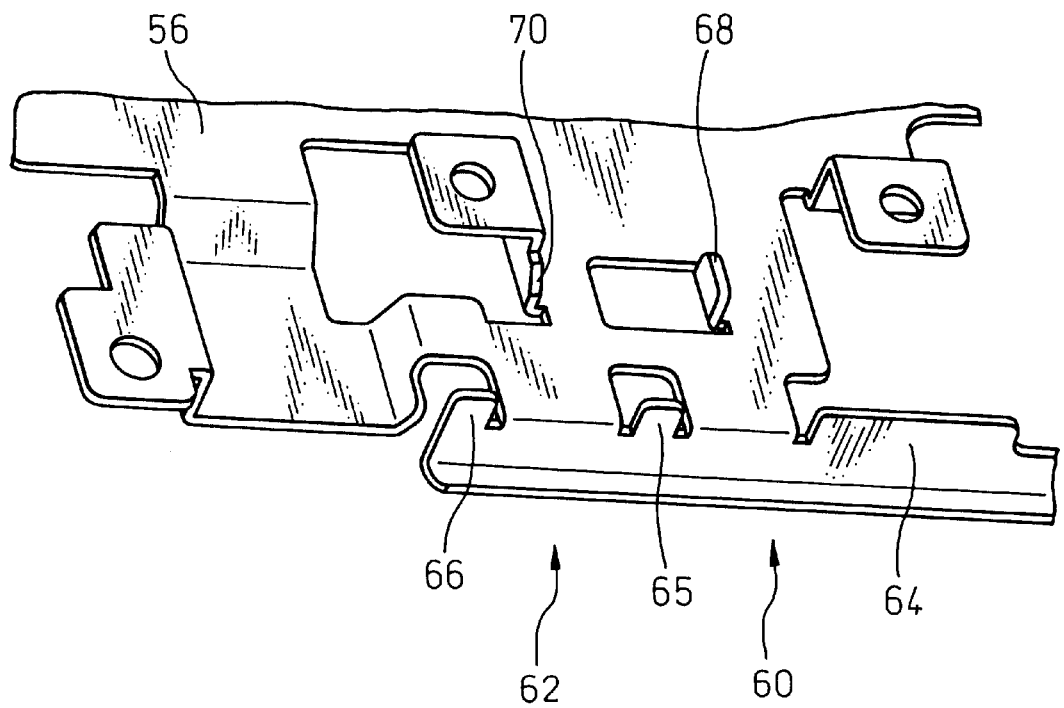
FIG. 20 is a perspective view illustrating the connector support plate of the housing shown in FIGS. 18 and 19.

The first engaging portions 64 and 65 and the second engaging portions 65 and 66 are formed as projections of the connector support plate 56 shown in FIG. 20. In FIG. 20, the three projections 64, 65 and 66 are formed along a straight line. The central projection 65 is common to the first engaging portion and the second engaging portion. The two projections 64 and 65 serve as the engaging portion for the first mounting portion 60, and the central projection 65 and the projection 66 serve as the engaging portion for the second mounting portion 62.

Therefore, the pair of engaging recesses 46d of the connector 46 for the modem shown in FIG. 10 are fitted to the projections 64 and 65 as the first engaging portion, and the connector 46 for the modem is held by the housing 24. The pair of engaging recesses 50d of the connector 50 for the LAN shown in FIG. 11 are fitted to the projections 65 and 66 as the second engaging portion, and the connector 50 for the LAN is held by the housing 24. The engaging recesses 48d and 52d of the connector 48 for outputting the image and of the member 52 are similarly fitted to the projections 65 and 66 as the second engaging portion.

There is no partitioning plate on the connector support plate 56 and, as will be understood from FIGS. 18 and 19, the first mounting portion 60 and the second mounting portion 62 include spaces communicated with each other. Therefore, the first mounting portion 60 and the second mounting portion 62 are formed in the minimum size necessary for arranging the two connectors.

The connector support plate 56 further has stoppers 68 and 70 positioned between two of projections 64, 65 and 66 of the engaging portions at the back of the first and second engaging portions 64, 65 and 66. The rear surfaces of the end walls 46e, 48e, 50e and 52e of the connectors 46, 48, 50 and of the member 52 are brought into contact with either the stopper 68 or 70.

Figure 21:
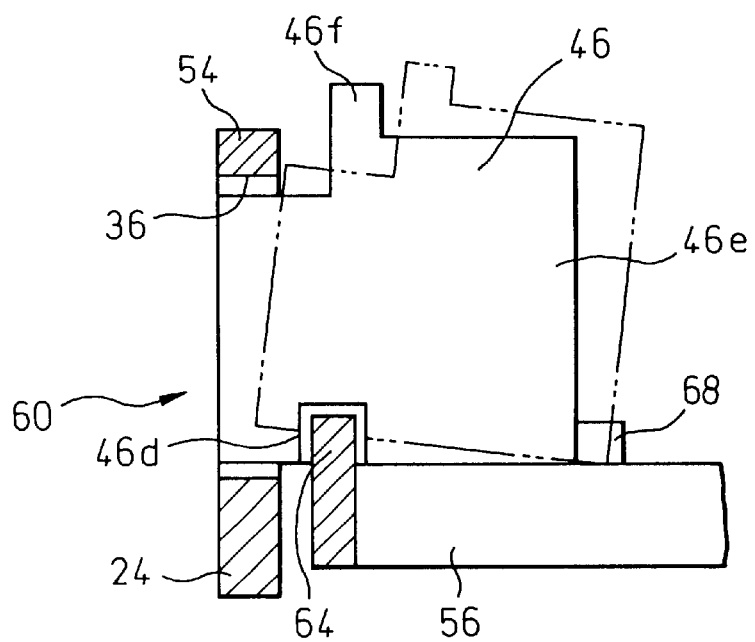
FIG. 21 is a cross-sectional view schematically illustrating the housing when the connector is being mounted to the mounting portion.

FIG. 21 is a view illustrating how the connector 46 for the modem on the first mounting portion 60 is mounted. First, the engaging recesses 46d of the connector 46 for the modem are fitted to the projections 64 and 65 which form the first engaging portion, and the connector 46 for the modem is pivotally moved with the engaging portions as a pivot center. Then, the upper end of the connector 46 for the modem shown in FIG. 21 comes in contact with the transverse wall 54 of the housing 24, rides over the transverse wall 54 while resiliently deforming the transverse wall 54, and is snap-fitted to the surrounding wall of the opening 36 in the side of the housing. Similarly, the connector 48 for outputting the image or any other member is mounted in the second mounting portion 62.

After the connector 46 for the modem is mounted in the first mounting portion 60 and the connector 48 for outputting the image is mounted in the second mounting portion 62, the metal fitting 34 for securing the connectors is mounted in a manner as shown in FIG. 24. As described above, the flat portion of the metal fitting 34 for securing the connectors holds the surface of the connector 46 for the modem and the surface of the connector 48 for outputting image, and the holding portions 34c and 34d are brought into engagement with the stopper portions 46f and 48f.

Thus, any two of the connectors 46 for the modem, the connector 48 for outputting image, the connector 50 for the LAN and the member 52 can be easily and reliably arranged in the limited space of the connector structure 26.

In the foregoing description the arrangements of the connector for the modem, the connector for the LAN, the connector for outputting image and the member having air holes are described. According to the present invention, however, other connectors and members of a structure similar to the connectors can be arranged without being limited to the above-mentioned examples.

As described above, the invention provides an electronic device which enables a plurality of connectors and other members to be selectively arranged in the two connector mounting portions.

What is claimed is:

1. An electronic device comprising:
a housing having a first mounting portion with an engaging portion and a second mounting portion with an engaging portion;
a first connector having an engaging portion that is engaged with said engaging portion of said first mounting portion and is arranged in said first mounting portion; and
a second connector having an engaging portion engaged with said engaging portion of said second mounting portion and arranged in said second mounting portion;
wherein said second connector is one of a third connector having a first shape and having said engaging portion and a fourth connector having a second shape different from said first shape and having said engaging portion.

2. An electronic device according to claim 1, wherein said first mounting portion and said second mounting portion of said housing include spaces communicating with each other.

3. An electronic device according to claim 1, wherein said housing is provided with at least one electric part, a main circuit board connected to said at least one electric part, and a circuit module connected to said first and second connectors.

4. An electronic device according to claim 1, wherein said housing is provided with at least one electronic part, a main circuit board connected to said at least one electronic part and one of said first connector and said second connector, and a circuit module connected to the other of said first connector and said second connector.

5. An electronic device according to claim 1, wherein said third connector is formed in a substantially unitary structure, and said fourth connector includes a connector body and a holder for holding said connector body.

6. An electronic device according to claim 1, wherein said housing includes a cover for covering said first and second mounting portions, said cover having a shape adapted to the shape of a top portion of said fourth connector.

7. An electronic device comprising:
a housing having a first mounting portion with an engaging portion and a second mounting portion with an engaging portion;
a first member having an engaging portion engaged with said engaging portion of said first mounting portion and arranged in said first mounting portion; and
a second member having an engaging portion engaged with said engaging portion of said second mounting portion and arranged in said second mounting portion;
wherein said second member is one of a third member having a first shape and having said engaging portion and a fourth member having a second shape different from said first shape and having said engaging portion.

8. An electronic device according to claim 7, wherein said first member is a connector, said third member is a connector, and said fourth member is a member having an air hole.

* * * * *